(12) United States Patent
Li

(10) Patent No.: US 9,261,916 B2
(45) Date of Patent: Feb. 16, 2016

(54) SLIDE ELECTRONIC APPARATUS AND LINEAR MOVING MECHANISM THEREOF

(71) Applicant: Wistron Corporation, New Taipei (TW)

(72) Inventor: Bo-Yi Li, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 392 days.

(21) Appl. No.: 13/893,359

(22) Filed: May 14, 2013

(65) Prior Publication Data
US 2014/0029175 A1   Jan. 30, 2014

(30) Foreign Application Priority Data

Jul. 30, 2012   (TW) .............................. 101127467 A

(51) Int. Cl.
*G06F 1/16*   (2006.01)

(52) U.S. Cl.
CPC ............. *G06F 1/1675* (2013.01); *G06F 1/1616* (2013.01); *G06F 1/1624* (2013.01); *G06F 1/1681* (2013.01)

(58) Field of Classification Search
CPC ........................................................ G06F 1/16
USPC ............. 361/679.01–679.45, 679.55–679.61, 361/724–747, 752–759, 796–837
See application file for complete search history.

(56) References Cited

U.S. PATENT DOCUMENTS

| | | | | |
|---|---|---|---|---|
| 6,034,867 A * | 3/2000 | Seo | ............. | G06F 1/1679 16/328 |
| 6,256,194 B1 * | 7/2001 | Choi | ............. | G06F 1/1616 292/4 |
| 7,168,336 B2 * | 1/2007 | Lin | ............. | G11B 17/028 74/406 |
| 7,184,263 B1 * | 2/2007 | Maskatia | ............. | G06F 1/1616 248/917 |
| 7,251,129 B2 * | 7/2007 | Lee | ............. | G06F 1/162 16/330 |
| 7,353,053 B2 * | 4/2008 | Prichard | ............. | G06F 1/1624 379/433.01 |
| 7,586,743 B2 * | 9/2009 | Lin | ............. | G06F 1/1616 361/679.55 |

(Continued)

FOREIGN PATENT DOCUMENTS

| TW | M424731 | 3/2012 |
|---|---|---|
| TW | M430812 | 6/2012 |

OTHER PUBLICATIONS

Office action mailed on Aug. 18, 2015 for the Taiwan application No. 101127467, filing date: Jul. 30, 2012, p. 2 line 10-26, p. 3 and p. 4 line 1-19.

*Primary Examiner* — Courtney Smith
*Assistant Examiner* — Rashen E Morrison
(74) *Attorney, Agent, or Firm* — Winston Hsu; Scott Margo

(57) ABSTRACT

A slide electronic apparatus and a linear moving mechanism thereof are disclosed. The slide electronic apparatus includes two casings and the linear moving mechanism connecting the two casings. The linear moving mechanism includes a rotatable part rotatably disposed on one of the two casings, a guiding part eccentrically mounted on the rotatable part, a link having a depression portion, and a pivotal connection part. The guiding part is disposed in the depression portion to be capable of driving the depression portion and driving the link by the depression portion to reciprocate in a first direction. The pivotal connection part connects the link and the other casing so that the two casing can move relatively. Thereby, the invention can transfer rotation movement to linear movement by use of the linear moving mechanism, which facilitates cover-lifting operation and adjustment in disposition angle of the casings for users.

20 Claims, 8 Drawing Sheets

(56) References Cited

U.S. PATENT DOCUMENTS

| | | | | |
|---|---|---|---|---|
| 7,599,721 B2* | 10/2009 | Taki | H04M 1/0237 361/517 |
| 7,730,587 B2* | 6/2010 | Chang | G06F 1/1679 16/340 |
| 8,335,079 B2* | 12/2012 | Yeh | H04M 1/0216 345/156 |
| 8,514,558 B2* | 8/2013 | Song | G06F 1/1624 16/284 |
| 2006/0038795 A1* | 2/2006 | Lee | E05B 65/006 345/173 |
| 2006/0071916 A1* | 4/2006 | Jeun | G06F 1/1615 345/179 |
| 2006/0215503 A1* | 9/2006 | Tatekawa | G11B 17/021 369/30.64 |
| 2007/0139877 A1* | 6/2007 | Kato | H04M 1/0237 361/679.09 |
| 2009/0016002 A1* | 1/2009 | Lai | G06F 1/1616 361/679.27 |
| 2009/0131127 A1* | 5/2009 | Hung | G06F 1/1616 455/575.4 |
| 2009/0227301 A1* | 9/2009 | Lindvall | G06F 1/1616 455/575.4 |
| 2012/0162879 A1* | 6/2012 | Totsuka | G06F 1/1616 361/679.01 |
| 2012/0251184 A1* | 10/2012 | Hashimoto | G03G 15/0136 399/223 |
| 2012/0312108 A1* | 12/2012 | Hsu | F16H 21/44 74/100.1 |
| 2013/0237887 A1* | 9/2013 | Chen | A61H 7/004 601/112 |
| 2014/0036434 A1* | 2/2014 | Jau | G06F 1/16 361/679.33 |
| 2014/0174216 A1* | 6/2014 | Peng | F16H 21/36 74/45 |
| 2014/0360296 A1* | 12/2014 | Hsu | E05D 3/122 74/98 |
| 2015/0153681 A1* | 6/2015 | Shiraki | G03G 21/1896 399/262 |

\* cited by examiner

SLIDE ELECTRONIC APPARATUS AND LINEAR MOVING MECHANISM THEREOF

BACKGROUND OF THE INVENTION

1. Field of the Invention

The invention relates to a slide electronic apparatus, and especially relates to a slide electronic apparatus using a linkage mechanism to perform a cover-lifting operation and a linear moving mechanism thereof.

2. Description of the Prior Art

A conventional notebook usually uses at least one hinges for connecting its system host and monitor. In a use, a user needs to rotate the monitor relative to the system host to a required angle by hands. Because in general, the hinge provides angular positioning by a friction mechanism, and the monitor may be fixed relative to the system host only by the hinges, the friction mechanism needs a not small friction force for maintaining the disposition angle of the monitor relative to the system host. The user use needs to pay a certain force for rotating the monitor. Besides, it is not easy to adjust the monitor to the required angle in one rotation.

There is another kind of notebook. Its monitor is supported on its system host by use of a slide mechanism and a pivotal support. Because the monitor is supported and positioned by the pivotal support together with the slide mechanism, the friction force provided by the slide mechanism for positioning can be much smaller than that provided by the above-mentioned hinge, which can mitigate the inconvenience of opening the monitor of the conventional notebook in a certain extent. However, the slide mechanism still uses friction force for positioning. When a force applied on the monitor (such as a touch screen) by the user is larger a little bit, the monitor may be shifted; i.e. the disposition angle of the monitor is changed. At this moment, the user may need to re-adjust the disposition angle of the monitor, which is still inconvenient. Furthermore, abrasion is involved in both the computer using only the hinges and the computer using the slide mechanism together with the pivotal support. After a long-term use, the friction force which the hinge or the slide mechanism can provide decreases, leading to instability of the disposition angle of the monitor, even to failure in positioning the monitor.

SUMMARY OF THE INVENTION

An objective of the invention is to provide a linear moving mechanism, which can transfer rotation movement to linear movement by use of a linkage mechanism for adjustment convenience for user and further can provide stable supporting structure by the movement stability of the linkage mechanism.

The linear moving mechanism of the invention is installed in a slide electronic apparatus. The slide electronic apparatus includes a first casing and a second casing. The linear moving mechanism includes a rotatable part, a guiding part, a link, and a pivotal connection part. The rotatable part is disposed on in first casing and capable of rotating relative to the first casing. The rotatable part has a rotation center. The guiding part is eccentrically mounted on the rotatable part relative to the rotation center. The link is capable of moving in a first direction relative to the first casing. The link has a depression portion. The depression portion extends in a second direction different to the first direction. The guiding part is disposed in the depression portion to be capable of driving the depression portion and driving the link by the depression portion to move in the first direction or in a direction reverse to the first direction. The pivotal connection part connects the link and the second casing, so that the second casing is capable of moving relative to the first casing. Thereby, a user can determine a linear displacement of the link by controlling an angular displacement of the rotatable part, so as to easily adjust an angular displacement of the second casing relative to the first casing (or a disposition angle of the second casing relative to the first casing), which solves the inconvenience of setting or adjusting the disposition angle of the monitor by use of friction force in the prior art. Furthermore, the invention can further use the property of the stable movement of the linkage mechanism formed by the linear moving mechanism to provide stable supporting effect to the first casing, so as to solve the problem of decreasing friction force and instable supporting structure of the conventional slide mechanism because of abrasion involved in the slide mechanism.

Another objective of the invention is to provide a slide electronic apparatus, which uses the linear moving mechanism of the invention to connect casings thereof capable of rotating relative to each other. Therefore, a user can easily adjust the disposition angle of one of the casings of the slide electronic apparatus and further can provide stable supporting structure to the casing by the movement stability of the linkage mechanism.

The slide electronic apparatus of the invention includes a first casing, a second casing, a support, and a linear moving mechanism. When the invention is applied to a notebook, the first casing is a system host of the notebook, and the second casing is a monitor of the notebook; however, the invention is not limited thereto. The support is pivotally connected to the first casing and the second casing respectively. The linear moving mechanism includes a rotatable part, a guiding part, a link, and a pivotal connection part. The rotatable part is disposed in the first casing and capable of rotating relative to the first casing. The rotatable part has a rotation center. The guiding part is eccentrically mounted on the rotatable part relative to the rotation center. The link is capable of moving in a first direction relative to the first casing. The link has a depression portion. The depression portion extends in a second direction different to the first direction. The guiding part is disposed in the depression portion to be capable of driving the depression portion and driving the link by the depression portion to move in the first direction or in a direction reverse to the first direction in coordination with the movement of the support with the first casting and the second casing, so that the first casing and the second casing can be closed or the second casing can be obliquely supported above the first casing. The pivotal connection part connects the link and the second casing, so that the second casing is capable of moving relative to the first casing. Similarly, a user can determine a linear displacement of the link by controlling an angular displacement of the rotatable part and further can coordinate with the supporting mechanism by the support to easily adjust an angular displacement of the second casing relative to the first casing (or a disposition angle of the second casing relative to the first casing), which solves the inconvenience of setting or adjusting the disposition angle of the monitor by use of friction force in the prior art. Furthermore, the invention can further use the property of the stable movement of the linkage mechanism formed by the linear moving mechanism in coordination with the supporting mechanism by the support to provide stable supporting effect to the first casing, so as to solve the problem of decreasing friction force and instable supporting structure of the conventional slide mechanism because of abrasion involved in the slide mechanism.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
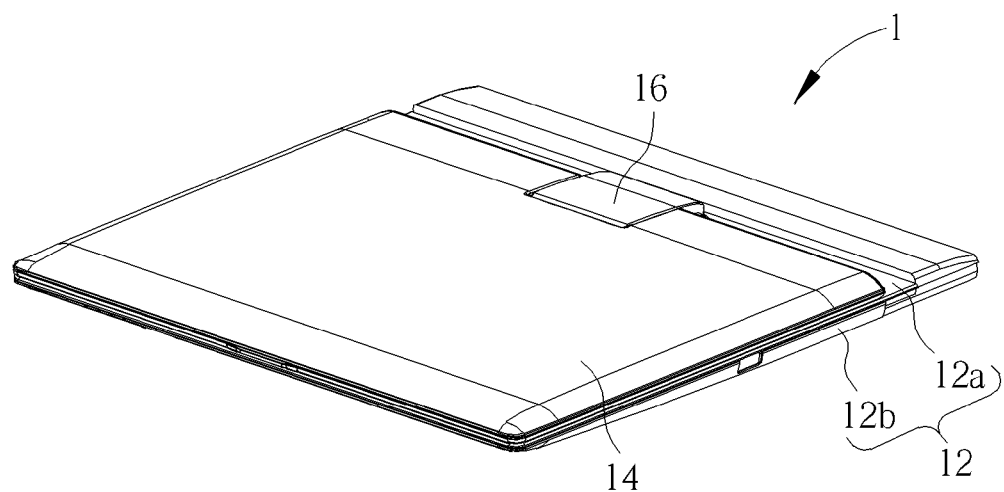
FIG. 1 is a schematic diagram illustrating a slide electronic apparatus at a closed state of a first preferred embodiment according to the invention.
Figure 2:
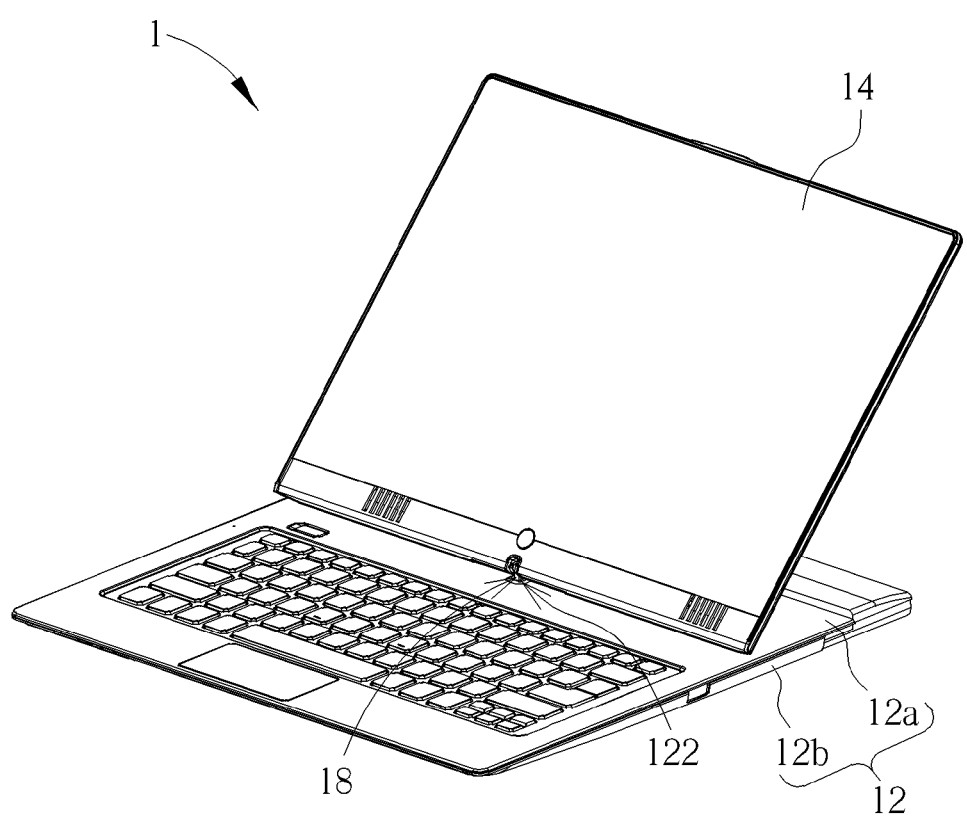
FIG. 2 is a schematic diagram illustrating the slide electronic apparatus in FIG. 1 at an open state.
Figure 3:
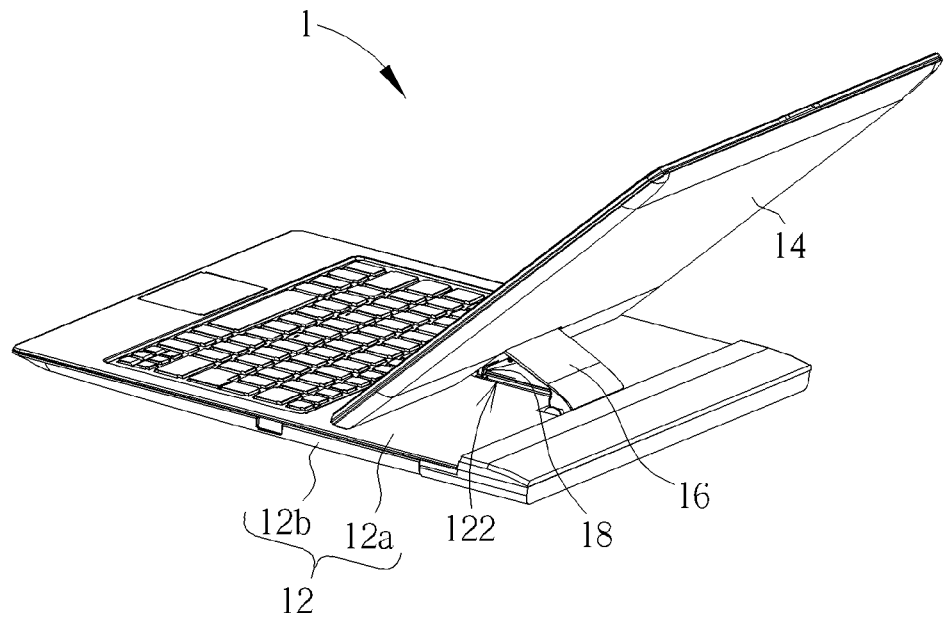
FIG. 3 is a schematic diagram illustrating the slide electronic apparatus in FIG. 2 from another view point.

Please refer to FIGS. 1 through 3. FIG. 1 is a schematic diagram illustrating a slide electronic apparatus 1 at a closed state of a first preferred embodiment according to the invention. FIG. 2 is a schematic diagram illustrating the slide electronic apparatus 1 at an open state. FIG. 3 is a schematic diagram illustrating the slide electronic apparatus 1 in FIG. 2 from another view point. The slide electronic apparatus 1 includes a first casing 12, a second casing 14, a support 16, and a linear moving mechanism 18. The support 16 is pivotally connected to the first casing 12 and the second casing 14 respectively. The first casing 12 has a track opening 122 extending in a first direction 124; in the embodiment, the first direction 124 is linear. The linear moving mechanism 18 is disposed in the first casing 12 and passes through the track opening 122 to protrude out to be pivotally connected to the second casing 14. Therefore, the first casing 12 and the second casing 14 are connected by the support 16 and the linear moving mechanism 18, so that the first casing 12 and the second casing 14 can be closed or the second casing 14 can be obliquely supported above the first casing. In the first embodiment, the slide electronic apparatus 1 is a notebook. The first casing 12 is a system host; the second casing 14 is a monitor. However, the invention is not limited thereto.

Figure 4:
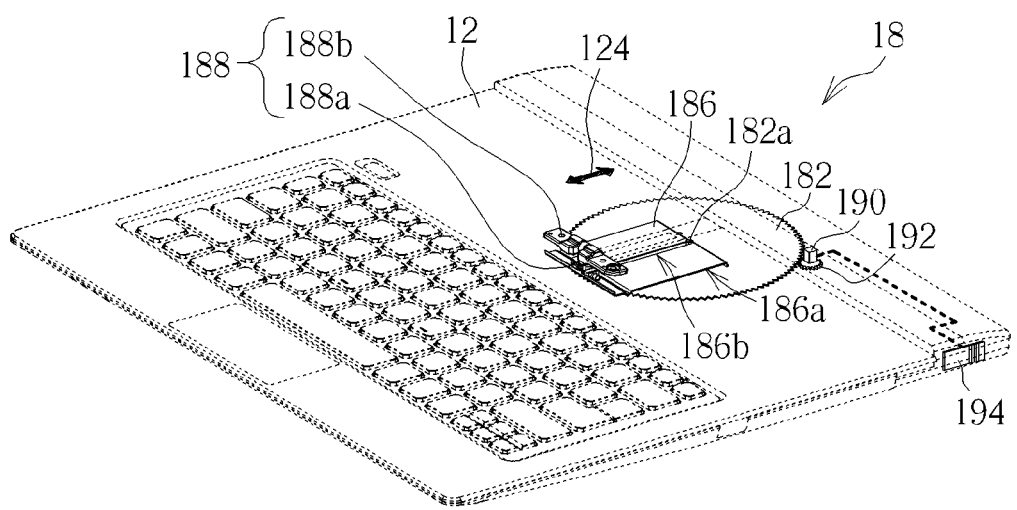
FIG. 4 is a schematic diagram illustrating a linear moving mechanism of the slide electronic apparatus in FIG. 1.
Figure 5:
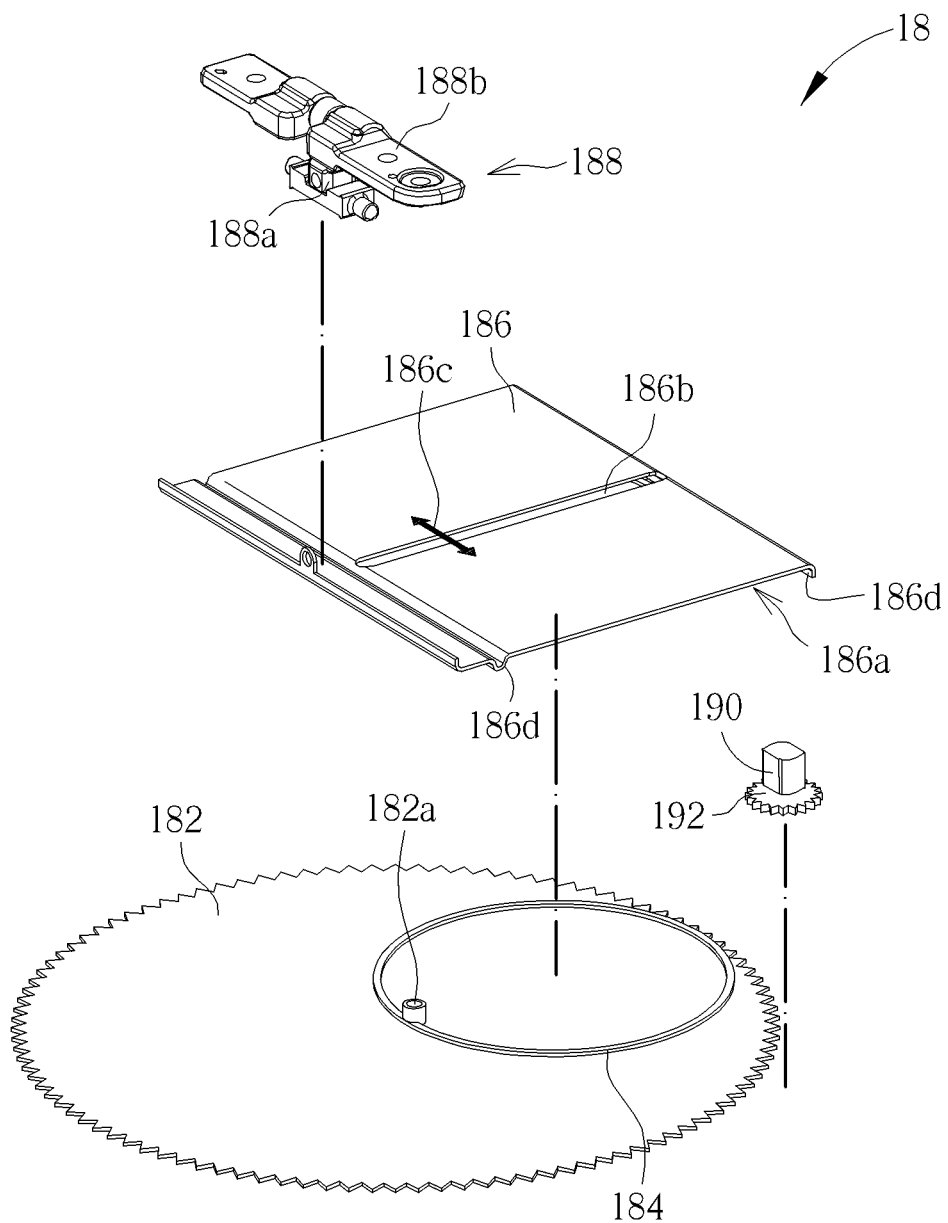
FIG. 5 is an exploded view of the linear moving mechanism in FIG. 4.

Please also refer to FIG. 4 and FIG. 5. FIG. 4 is a schematic diagram illustrating the linear moving mechanism 18; therein, the profile of the first casing 12 is shown by dashed lines in FIG. 4. FIG. 5 is an exploded view of the linear moving mechanism 18. In further details, the linear moving mechanism 18 includes a rotatable part 182, a guiding part 184, a link 186, a pivotal connection part 188, a motor 190, and a drive gear 192, which are disposed in the first casing 12. The rotatable part 182 is capable of rotating relative to the first casing 12. In the first embodiment, the rotatable part 182 is a driven gear disk capable of meshing with the drive gear 192. The rotatable part 182 has a shaft 182a and is connected to the first casing 12 by the shaft 182a. The shaft 182a is located at the rotation center of the rotatable part 182 to be regarded as the rotation center in the embodiment. The guiding part 184 is eccentrically mounted on the rotatable part 182 relative to the rotation center (i.e. the shaft 182a); that is, when the rotatable part 182 rotates, the guiding part 184 also rotates relative to the shaft 182a.

The link 186 has a depression portion 186a. The link 186 is disposed between the first casing 12 and the rotatable part 182 so that the guiding part 184 is disposed in the depression portion 186a in a slidable way. In the first embodiment, the link 186 is a plate part, formed in one piece, but the invention is not limited thereto. Thereby, when the rotatable part 182 drives the guiding part 184 to rotate, the guiding part 184 slides in the depression portion 186a and pushes the link 186 through the slide walls of the depression portion 186a, so that the link 186 is capable of moving relative to the first casing 12 in the first direction 124. In the first embodiment, for the enhancement of the movement stability of the link 186, the link 186 has a guided slot 186b also extending in the first direction 124. The shaft 182a is also regarded as a guiding boss and relatively slides in the guided slot 186b. Therefore, the link 186 can move under a guidance effect by the shaft 182a for improvement on the movement stability. It is added that the guiding boss (i.e. the shaft 182a) will rotate together with the rotatable part 182 in fact. For the first casing 12, (the center of) the guiding boss is fixed disposed relative to the first casing 12. In another aspect, in practice, the guiding boss can be mounted on the first casing 12 directly, which also perform the guidance effect to the link 186. However, the invention is not limited thereto. For example, the guidance effect can be performed by other structure such as a depression portion formed on the first casing 12 to constrain the movement of the link 186.

In addition, in the first embodiment, the depression portion 186a extends in a second direction 186c perpendicular to the first direction 124, but the invention is not limited thereto. In principle, as long as the second direction 186c of the depression portion 186a is different to the first direction 124, the guiding part 184 can drive the link 186 through the depression portion 186a to move in the first direction 124 or in a direction reverse to the first direction 124, i.e. reciprocating in the first direction 124 in this embodiment, when the rotatable part 182 rotates. Furthermore, in the first embodiment, the depression portion 186a is formed by two linear walls 186d (also taken as the side walls of the depression portion 186a) parallel to each other and extending in the second direction 186c. It is added more that in the first embodiment, the guiding part 184 is a circular ring, the center of which is shifted from the rotation center of the rotatable part 182. The diameter of the circular ring is substantially the same as the width of the depression portion 186a. The guiding boss (i.e. the shaft 182a) is located at an inner side of the circular ring. The guided slot 186b is formed in the depression portion 186a. However, the invention is not limited thereto.

The pivotal connection part 188 is mounted on the link 186 and connected to the second casing 14, so that the second casing 14 is capable of rotating relative to the first casing 12. In the first embodiment, the pivotal connection part 188 includes a first fixing mount 188a and a second fixing mount 188b pivotally connected to the first fixing mount 188a. The first fixing mount 188a is mounted on the link 186 by screws. The second fixing mount 188b passes through the track opening 122, protrudes out of the first casing 12 and is mounted at a side portion of the second casing 14. Thereby, the second casing 14 is capable of rotating relative to the first casing 12. However, in practice, the pivotal connection part of the invention is not limited thereto. It is added that in the first embodiment, the track opening 122 also performs a guidance effect on the movement of the pivotal connection part 188. Therefore, overall, during the movement of the link 186, the link 186 is affected by the guidance effect by the shaft 182a and the track opening 122, so that the link 186 can stably move in the first direction 124.

The drive gear 192 is disposed on the motor 190 and meshes with the rotatable part 182. In the first embodiment, the motor 190 is electrically connected to a switch 194 (shown by bold dashed lines in FIG. 4) disposed a side portion of the first casing 12. Thereby, the user can easily use the switch 194 to trigger the motor 190 to rotate to rotate the rotatable part 182 through the drive gear 192. The guiding part 184 rotates together with the rotatable part 182 to drive the link 186 through the depression portion 186a to move in the first direction 124.

Figure 6:
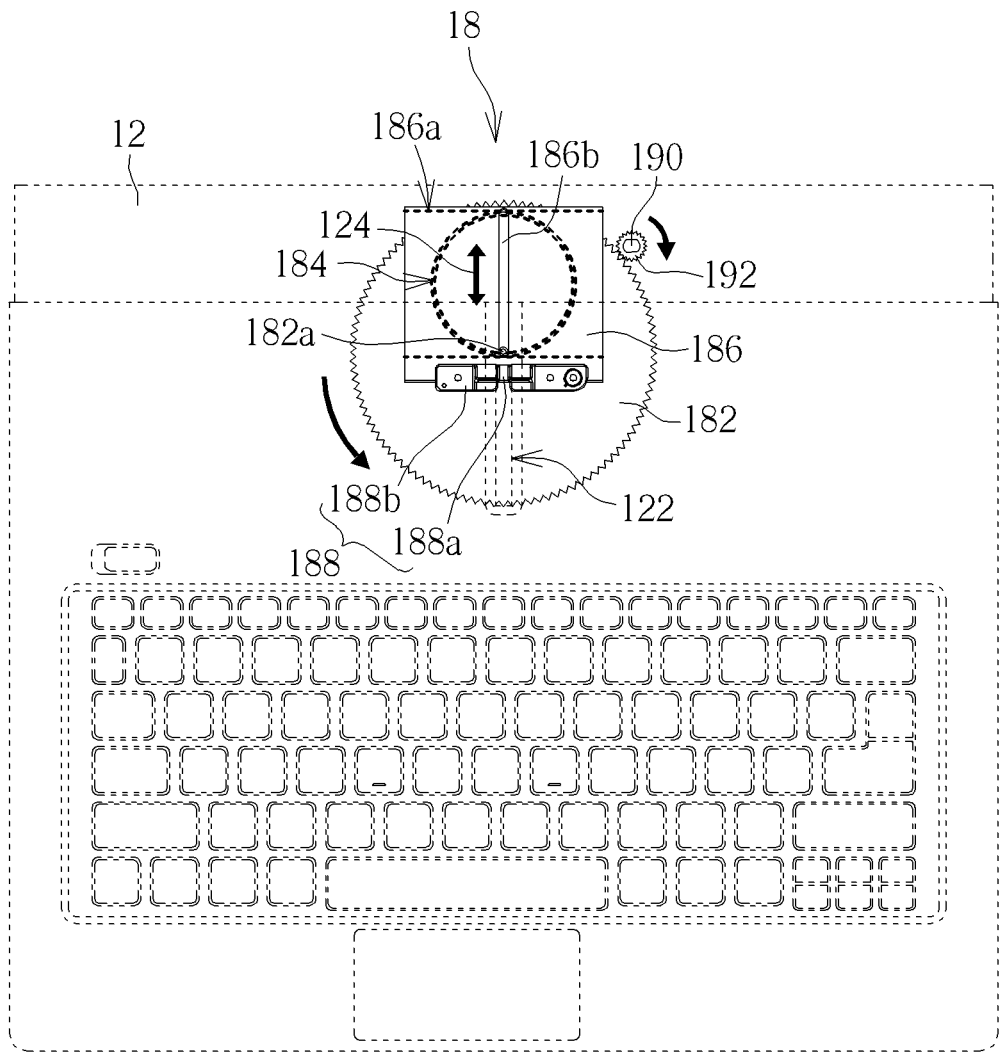
FIG. 6 and FIG. 7 are successive movement diagrams of the linear moving mechanism in FIG. 4.
Figure 7:
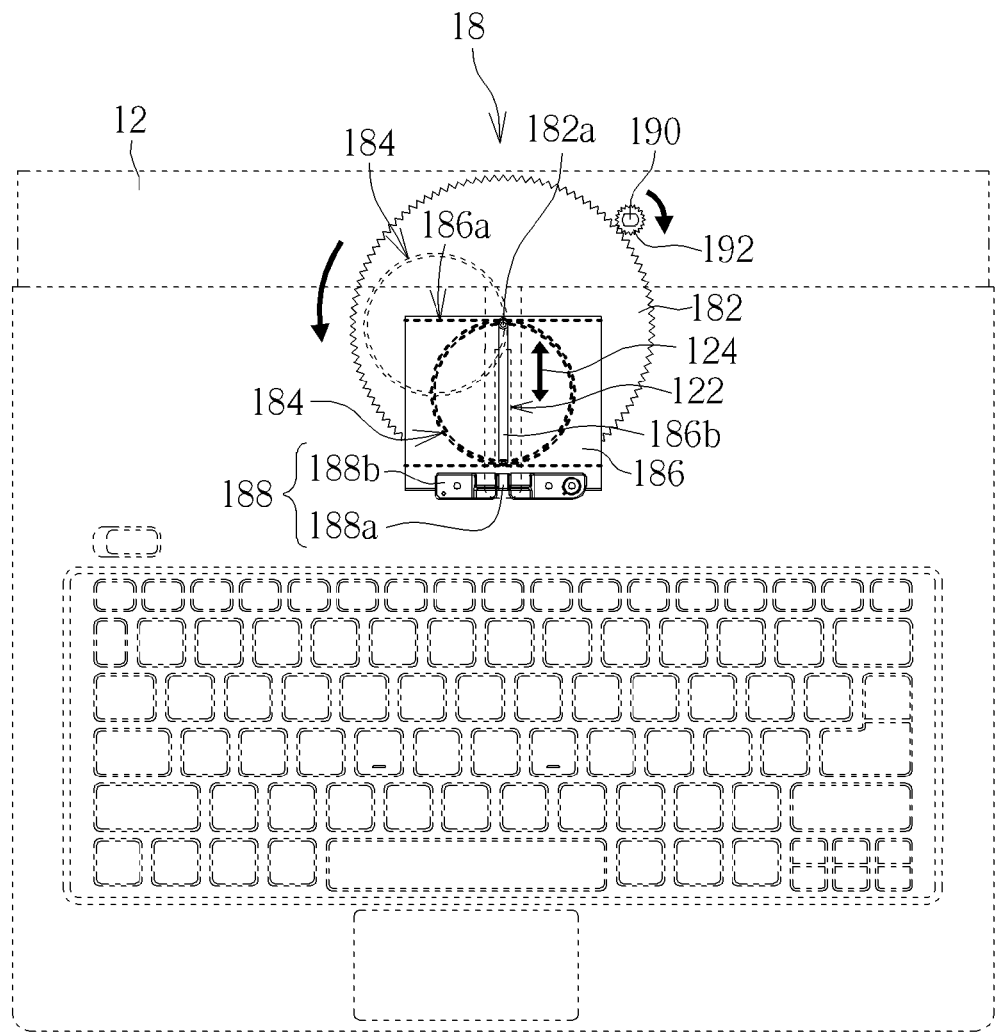

Please refer to FIG. 6 and FIG. 7, which are successive movement diagrams of the linear moving mechanism 18. Therein, the profile of the first casing 12 is shown by dashed lines in the figures for showing the position of the pivotal connection part 188, connected to the second casing 14, relative to the first casing 12; the profiles of the guiding part 184 and the depression portion 186a are shown by bold dashed lines in the figures for showing the relative position thereof. In the first embodiment, as shown by FIG. 6 and FIG. 7, the motor 190 drives the drive gear 192 to clockwise rotate. The rotatable part 182 is then driven by the drive gear 192 to anticlockwise rotate. When the rotatable part 182 keeps rotating, the link 186 will be driven by the guiding part 184 to reciprocate in the first direction 124. The pivotal connection part 188 connected to the second casing 14 also reciprocates accordingly and has two dead points. One of the dead points is shown as FIG. 6. At this moment, the pivotal connection part 188 is relatively close to the support 16. The second casing 14 and the first casing 12 are closed, as shown FIG. 1. The other dead point is shown as FIG. 7. At this moment, the pivotal connection part 188 is relatively far away from the support 16. The second casing 14 is obliquely supported above the first casing 12, shown as FIG. 2 and FIG. 3. It is added that the second fixing mount 188b rotates relative to the first fixing mount 188a when the second casing 14 rotates relative to the first casing 12. For easy comparison in the two figures, the second fixing mount 188b of the pivotal connection part 188 remains horizontal in both figures.

Figure 8:
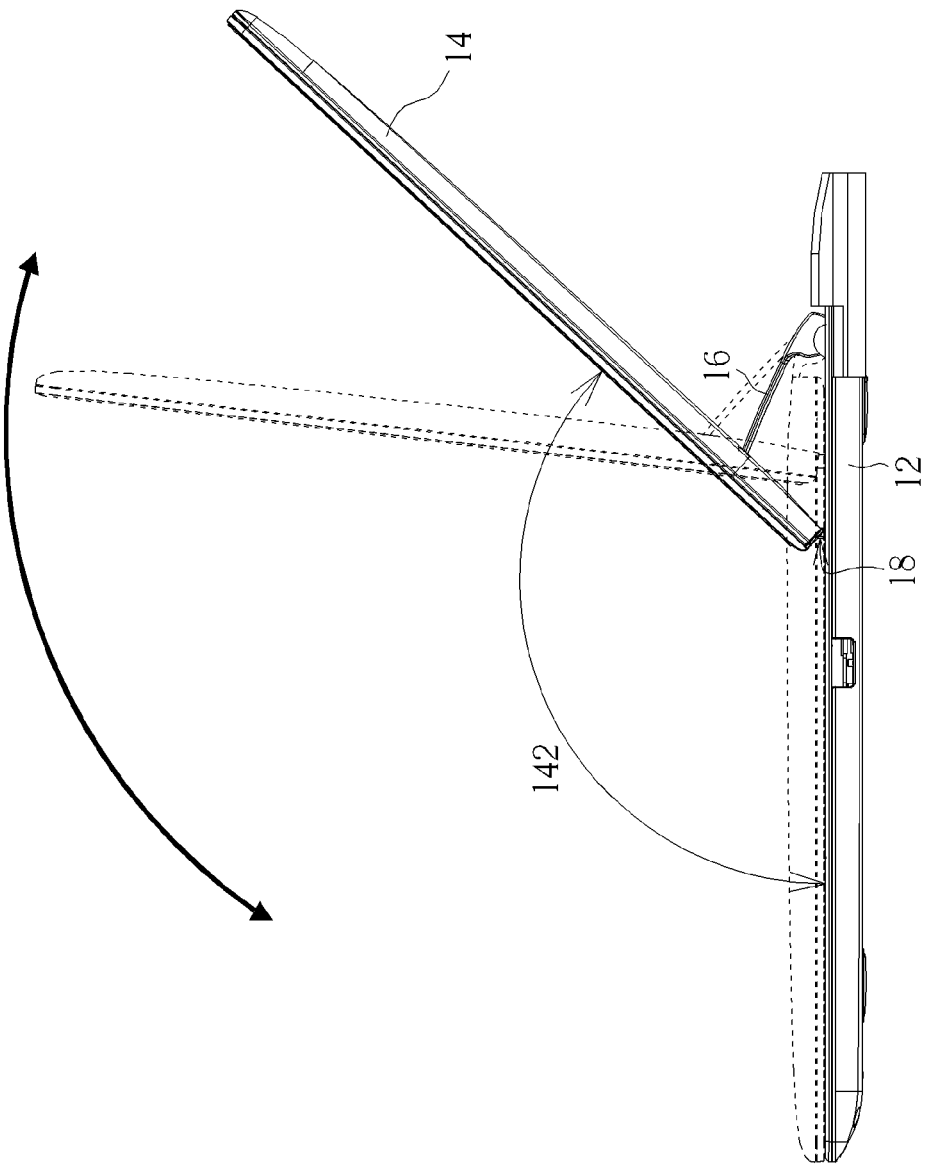
FIG. 8 is a side-viewed diagram illustrating the slide electronic apparatus in FIG. 1 when the linear moving mechanism moves.

Please also refer to FIG. 8. FIG. 8 is a side-viewed diagram illustrating the slide electronic apparatus 1 when the linear moving mechanism 18 moves. In sum, as the link 186 moves, the second casing 14 can be at the closed or open state by the linkage of the pivotal connection part 188 and the support 16. That is, when the pivotal connection part 188 moves relative to the first casing 12, the support 16 rotates relative to the first casing 12, and the second casing 14 linearly moves and rotates relative to the first casing 12, so that the second casing 14 and the first casing 12 can be closed or the second casing 14 can be obliquely supported above the first casing 12. In FIG. 8, solid lines show the slide electronic apparatus 1 at the open state. At this moment, the pivotal connection part 188 is located at the dead point shown in FIG. 7. The open angle 142 for the second casing 14 is largest. In the first embodiment, the open angle 142 is about 130 degrees, but the invention is not limited thereto. In principle, the open angle 142 can be determined by the stroke of the pivotal connection part 188, the length of the support 16, and the pivotal position of the support 16 with the second casing 14. In addition, the rotatable part 182 is driven to rotate by the drive gear 192 having a much relatively smaller radius, so the motor 190 uses its self-positioning effect to provide positioning effect through the drive gear 192 to the rotatable part 182. Thereby, in practice, the open angle 142 can be another angle smaller than the above maximum angle by the user's request, without concern about any unexpected rotation of the second casing 14. For example, when the user touches the second casing 14 (e.g. having a touch display panel) by fingers, the second casing 14 can still remain positioned, which avoids the inconvenience to the user in the prior art that the user touching the monitor may make the monitor move; i.e. the disposition angle of the monitor changes. Furthermore, the linear moving mechanism 18 stably supports the second casing 14 not directly by friction force, so as to avoid the occurrence of decreasing supporting force to the monitor due to abrasion produced after a long-term use in the prior art. Besides, in the first embodiment, the rotatable part 182 is driven by gear mechanism, which can reduce abrasion greatly.

It is added that please refer to FIGS. 1 through 5. In the first embodiment, the first casing 12 includes a top cover 12a and a bottom cover 12b. The track opening 122 is formed on the top cover 12a. The most components of the linear moving mechanism 18 are disposed on the top cover 12b, so that the linear moving mechanism 18 is disposed to be closer to the second casing 14, which is conducive to the movement stability of the linear moving mechanism 18 and also to reduction or elimination of the probability of structurally interfering with other components in the first casing 12.

Figure 9:
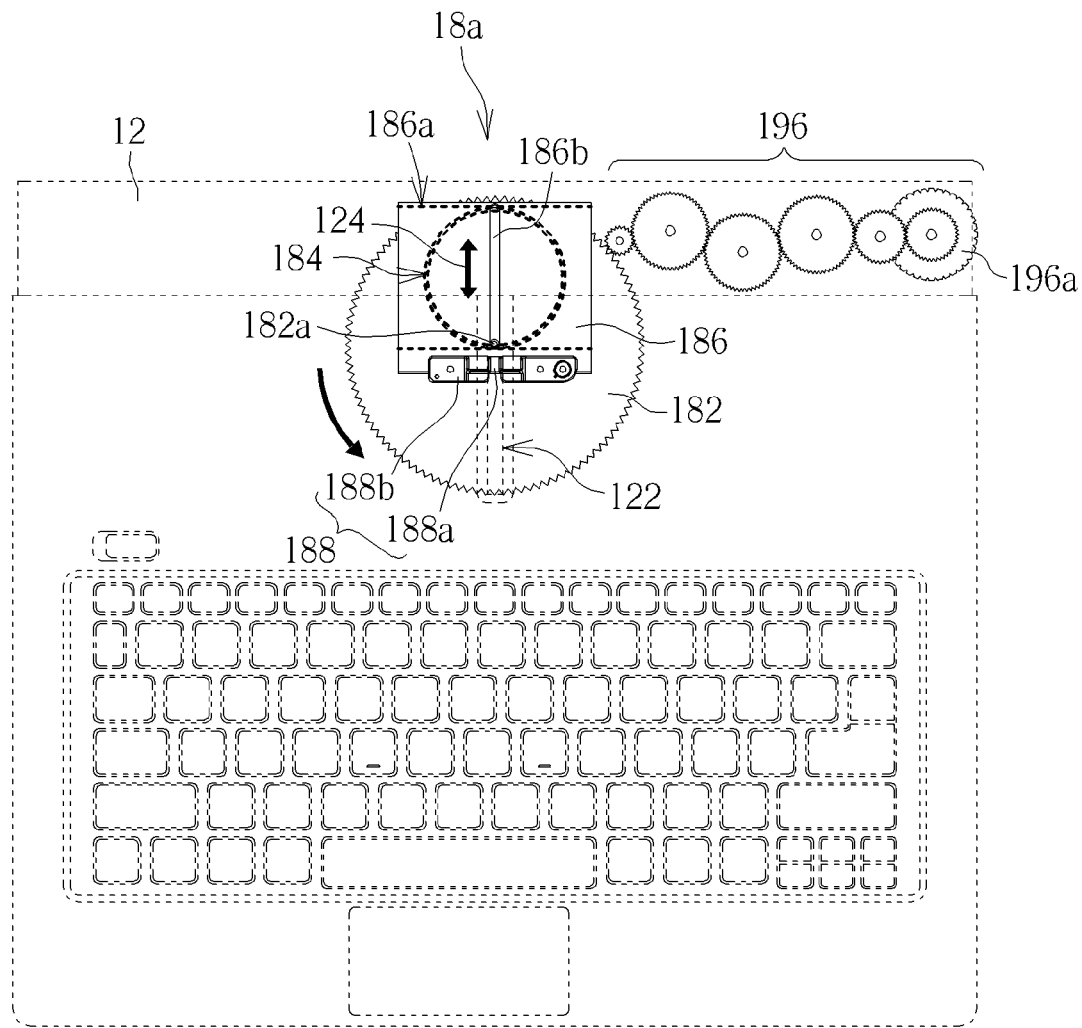
FIG. 9 is a schematic diagram illustrating the disposition of the linear moving mechanism in the first casing according to a second embodiment.

In the first embodiment, the rotation of the rotatable part 182 is activated by electric power, but the invention is not limited thereto. Please refer to FIG. 9, which is a schematic diagram illustrating the disposition of the linear moving mechanism 18a in the first casing 12 according to a second embodiment. Therein, for simple illustration, the profile of the first casing 12 is shown by dashed lines in the figure. The linear moving mechanism 18a is similar in structure to the linear moving mechanism 18. The main difference is that the linear moving mechanism 18a is activated by man power. The rotatable part 182 of the linear moving mechanism 18a is driven by a gear set 196. A gear 196a of the gear set 196 is exposed out of the first casing 12. Thereby, the user can rotate the drive gear 196a to directly rotate the rotatable part 182, which also can obtain the effect of adjusting the position of the link 186. Furthermore, the drive gear 196a is located at a side portion of the first casing 12 for convenience in use to the user, but the invention is not limited thereto. It is added that when the gear set 196 includes many gears, and the radii of the gears are chosen properly, the gear set 196 can provide a positioning effect to the rotatable part 182 in a certain extent, which can sufficiently overcome the effect by an operation force during the user using the touch panel on the structural stability of the linear moving mechanism 18a. For other descriptions of the linear moving mechanism 18a, please refer to the relevant descriptions of the linear moving mechanism 18. They are not described herein.

Figure 10:
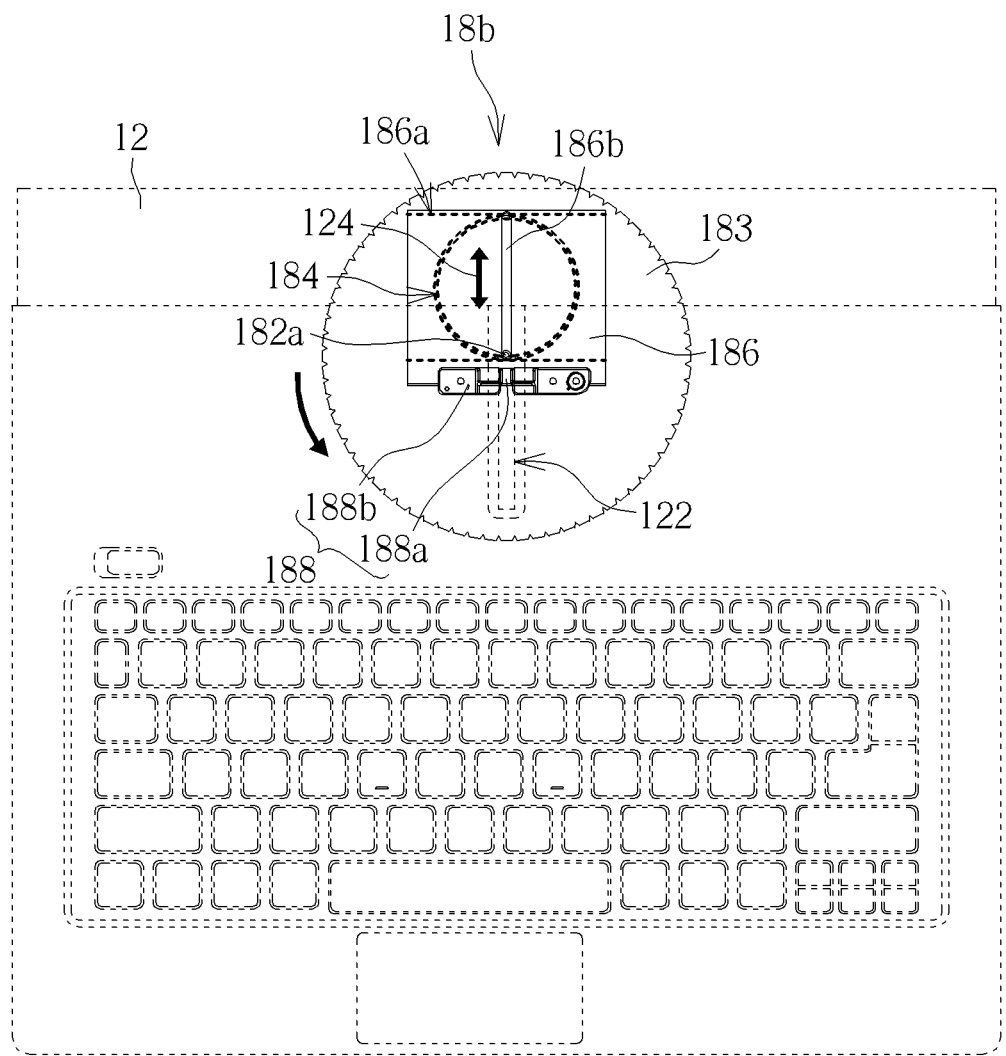
FIG. 10 is a schematic diagram illustrating the disposition of the linear moving mechanism in the first casing according to a third embodiment.

Please refer to FIG. 10, which is a schematic diagram illustrating the disposition of the linear moving mechanism 18b in the first casing 12 according to a third embodiment. Therein, for simple illustration, the profile of the first casing 12 is shown by dashed lines in the figure. The linear moving mechanism 18b is similar in structure to the linear moving mechanism 18. The main difference is that the linear moving mechanism 18b is activated by man power. The rotatable part 183 of the linear moving mechanism 18b is partially exposed out of the first casing 12 directly. The user can obtain the effect of adjusting the position of the link 186 by directly rotating the rotatable part 183. For other descriptions of the linear moving mechanism 18b, please refer to the relevant descriptions of the linear moving mechanism 18. They are not described herein.

In the above embodiments, the linear moving mechanisms 18, 18a and 18b are designed to transfer rotation movement to linear movement, so the rotatable parts 182 and 183 can obtain the cyclic operation of closing and opening the first casing 12 and the second casing 14 with only one rotation direction. Furthermore, when the rotatable parts 182 and 183 is rotated in a reverse rotation direction, the rotation of the second casing 14 is also reversed, which facilitates the adjustment of the open angle 142 of the second casing 14 to the user. In addition, when the open angle 142 of the second casing 14 reaches the maximum, the pivotal connection part 188 is located at one of the dead points of the reciprocation stroke. At this moment, the linear moving mechanisms 18, 18a and 18b is under a structural stabilization; that is, the second casing 14 can be stably supported without any external supporting force.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A linear moving mechanism, installed in a slide electronic apparatus, the slide electronic apparatus comprising a first casing and a second casing, the linear moving mechanism comprising:
   a rotatable part disposed in the first casing, the rotatable part having a rotation center and being rotatable about the rotation center relative to the first casing;
   a guiding part eccentrically mounted on the rotatable part relative to the rotation center;
   a link movable in a first direction relative to the first casing, the link having a depression portion, the depression portion extending in a second direction different to the first direction, the guiding part being disposed in the depression portion to move parallel to the second direction relative to the link, so that the guiding part drives the link by the depression portion to move in the first direction or in a direction reverse to the first direction; and
   a pivotal connection part connecting the link and the second casing, so that the second casing moves through the pivotal connection part relative to the first casing.

2. The linear moving mechanism of claim 1, wherein the rotatable part is partially exposed out of the first casing.

3. The linear moving mechanism of claim 1, further comprising a motor, a switch for triggering the motor, and a drive gear mounted on the motor, wherein the motor and the drive gear are disposed in the first casing, the switch is exposed out of the first casing, and the rotatable part is a driven gear disk meshing with the drive gear.

4. The linear moving mechanism of claim 1, further comprising a guiding boss mounted relative to the first casing, wherein the link has a guided slot, the guided slot extends in the first direction, and the guiding boss relatively moves in the guided slot.

5. The linear moving mechanism of claim 4, wherein the guiding boss is mounted at the rotation center of the rotatable part.

6. The linear moving mechanism of claim 5, wherein the guiding part is a circular ring, the guiding boss is located at an inner side of the circular ring, and the guided slot is formed in the depression portion.

7. The linear moving mechanism of claim 1, wherein the guiding part is a circular ring.

8. The linear moving mechanism of claim 1, the first casing having a track opening, wherein the rotatable part, the guiding part, and the link are disposed in the first casing, and the pivotal connection part passes through the track opening to protrude out of the first casing.

9. The linear moving mechanism of claim 1, wherein the link comprises two linear walls parallel to each other and extending in the second direction, the two linear walls form the depression portion, and the second direction is perpendicular to the first direction.

10. A slide electronic apparatus, comprising:
    a first casing;
    a second casing;
    a support pivotally connected to the first casing and the second casing respectively; and
    a linear moving mechanism, comprising:
       a rotatable part disposed in the first casing, the rotatable part having a rotation center and being rotatable about the rotation center relative to the first casing;
       a guiding part eccentrically mounted on the rotatable part relative to the rotation center;
       a link movable in a first direction relative to the first casing, the link having a depression portion, the depression portion extending in a second direction different to the first direction, the guiding part being disposed in the depression portion to move parallel to the second direction relative to the link, so that the guiding part drives the link by the depression portion to move in the first direction or in a direction reverse to the first direction, so that the first casing and the second casing are closed or the second casing is obliquely supported above the first casing; and
       a pivotal connection part connecting the link and the second casing, so that the second casing moves through the pivotal connection part relative to the first casing.

11. The slide electronic apparatus of claim 10, wherein the rotatable part is partially exposed out of the first casing.

12. The slide electronic apparatus of claim 10, wherein the linear moving mechanism comprises a motor, a switch for triggering the motor, and a drive gear mounted on the motor, the motor and the drive gear are disposed in the first casing, the switch is exposed out of the first casing, and the rotatable part is a driven gear disk meshing with the drive gear.

13. The slide electronic apparatus of claim 10, wherein the linear moving mechanism comprises a guiding boss mounted relative to the first casing, the link has a guided slot, the guided slot extends in the first direction, and the guiding boss relatively moves in the guided slot.

14. The slide electronic apparatus of claim 13, wherein the guiding boss is mounted at the rotation center of the rotatable part.

15. The slide electronic apparatus of claim 14, wherein the guiding part is a circular ring, the guiding boss is located at an inner side of the circular ring, and the guided slot is formed in the depression portion.

16. The slide electronic apparatus of claim 10, wherein the guiding part is a circular ring.

17. A slide electronic apparatus, comprising:
    a first casing having a track opening;
    a second casing;
    a support pivotally connected to the first casing and the second casing respectively; and
    a linear moving mechanism, comprising:
       a rotatable part disposed in the first casing, the rotatable part having a rotation center and being rotatable about the rotation center relative to the first casing;

a guiding part disposed in the first casing and eccentrically mounted on the rotatable part relative to the rotation center;

a link disposed in the first casing and movable in a first direction relative to the first casing, the link having a depression portion, the depression portion extending in a second direction different to the first direction, the guiding part being movably disposed in the depression portion to drive the link by the depression portion to move in the first direction or in a direction reverse to the first direction, so that the first casing and the second casing are closed or the second casing is obliquely supported above the first casing; and a pivotal connection part passing through the track opening to protrude out of the first casing and connecting the link and the second casing, so that the second casing moves through the pivotal connection part relative to the first casing.

18. The slide electronic apparatus of claim 17, wherein the first casing comprises a top cover and a bottom cover, the track opening is formed on the top cover, the rotatable part is disposed on the top cover, and the link is disposed between the top cover and the rotatable part.

19. The slide electronic apparatus of claim 18, wherein the linear moving mechanism comprises a guiding boss mounted at the rotation center of the rotatable part, the link has a guided slot, the guided slot is formed in the depression portion and extends in the first direction, the guiding boss relatively moves in the guided slot, and the rotatable part is disposed on the top cover through the guiding boss.

20. The slide electronic apparatus of claim 10, wherein the link comprises two linear walls parallel to each other and extending in the second direction, the two linear walls form the depression portion, and the second direction is perpendicular to the first direction.

* * * * *